United States Patent [19]

Salee

[11] 4,221,694

[45] Sep. 9, 1980

[54] GLASS-FILLED POLYBUTYLENE TEREPHTHALATE COMPOSITIONS OF DIMINISHED WARPAGE

[75] Inventor: Gideon Salee, Williamsville, N.Y.

[73] Assignee: Hooker Chemicals & Plastics Corp., Niagara Falls, N.Y.

[21] Appl. No.: 962,545

[22] Filed: Nov. 20, 1978

[51] Int. Cl.$^2$ .............................................. C08K 7/14
[52] U.S. Cl. ................... 260/40 R; 525/444; 525/448
[58] Field of Search ............ 260/40 R, 860; 525/444, 525/448

[56] References Cited

U.S. PATENT DOCUMENTS

| | | | |
|---|---|---|---|
| 3,907,926 | 9/1975 | Brown et al. | 525/444 |
| 3,946,091 | 3/1976 | Sakata et al. | 260/860 |
| 4,013,613 | 3/1977 | Abolins et al. | 525/444 |
| 4,064,098 | 12/1977 | Saitoh et al. | 525/444 |
| 4,111,893 | 9/1978 | Gasmon et al. | 260/40 R |
| 4,123,420 | 10/1978 | Kyo et al. | 260/873 X |

FOREIGN PATENT DOCUMENTS

| | | | |
|---|---|---|---|
| 2206804 | 8/1973 | Fed. Rep. of Germany | 260/40 R |
| 2333017 | 1/1974 | Fed. Rep. of Germany . | |
| 47/24249 | 7/1972 | Japan . | |
| 49/77823 | 3/1974 | Japan . | |
| 50/23447 | 3/1975 | Japan . | |
| 50/34342 | 4/1975 | Japan . | |
| 49/63864 | 12/1975 | Japan . | |
| 52/31171 | 5/1977 | Japan . | |
| 1002545 | 8/1965 | United Kingdom . | |
| 1410085 | 10/1975 | United Kingdom . | |
| 1496018 | 12/1977 | United Kingdom . | |

OTHER PUBLICATIONS

J. A. Brydson, *Plastics Materials* (1966), p. 336.
*Chem. Abs.*, para. 83:80466h (1975).

*Primary Examiner*—Sandra M. Person
*Attorney, Agent, or Firm*—Peter F. Casella; James F. Mudd; David A. Stein

[57] ABSTRACT

This invention relates to a thermoplastic polymeric composition which comprises a glass fiber-filled polybutylene terephthalate and which contains as an improvement a warp-inhibiting amount of a polymeric additive consisting of a linear aromatic substantially halogen-free polyester consisting of a bisphenol monomer residue and a dicarboxylic acid monomer residue and having a relatively low intrinsic viscosity. The compositions exhibit substantially diminished warpage on molding without a deleterious effect on the other properties of the glass fiber-filled polybutylene terephthalate. Preferred compositions of the invention also exhibit enhanced tensile strength compared to comparable pure glass fiber-filled polybutylene terephthalate.

16 Claims, No Drawings

GLASS-FILLED POLYBUTYLENE TEREPHTHALATE COMPOSITIONS OF DIMINISHED WARPAGE

BACKGROUND OF THE INVENTION

The invention relates to improved linear alkylene terephthalate polymers containing a reinforcing filler and more particularly relates to improved glass fiber-filled polybutylene terephthalate compositions. It is especially concerned with glass fiber-filled polybutylene terephthalate compositions exhibiting diminished warpage on molding without a deleterious effect on the other properties of the glass fiber-filled polybutylene terephthalate.

Polybutylene terephthalate containing glass fiber filler as reinforcing filler is widely employed as an engineering thermoplastic composition, for example in the preparation of molded articles on account of its excellent tensile strength, high heat distortion temperature, good processability and excellent chemical resistance. Glass fiber-filled polybutylene terephthalate however suffers from the disadvantage of undergoing a high degree of warpage on molding. This problem which distinguishes glass fiber-filled polybutylene terephthalate from other comparable glass fiber-filled alkylene terephthalate polymer e.g. glass fiber-filled polyethylene terephthalate, is believed to be principally due to the effect of the exceptionally high rate of polymer crystallization during the molding of the polybutylene terephthalate compositions (which crystallization rate is, in contrast, for example, to the well known slow rate of crystallization of comparable polyethylene terephthalate compositions). The exceptionally high rate of crystallization occurring with the polybutylene terephthalate compositions promotes anisotropy in the molded glass fiber-filled polybutylene terephthalate which in turn, gives rise to uneven shrinkage in the molded product thereby resulting in enhanced product warpage. (The foregoing explanation is offered to clarify the nature of the high product warpage encountered on molding conventional glass fiber-filled polybutylene terephthalate. However, the invention is not bound to any particular theoretical explanation of warpage in glass fiber-filled polybutylene terephthalate).

It is the principal object of this invention to provide a glass fiber-filled polybutylene terephthalate composition exhibiting diminished warpage on molding.

It is another object of this invention to provide a warpage-inhibited glass fiber-filled polybutylene terephthalate which retains substantially the known desirable beneficial properties of the prior art glass fiber-filled polybutylene terephthalate.

These and other objects and advantages will be apparent from the following description of the invention.

SUMMARY OF THE INVENTION

The foregoing objects are attained, according to the invention by provision of a thermoplastic polymeric composition which contains a glass fiber-filled polybutylene terephthalate and a minor proportion of an organic polymeric additive consisting of a substantially halogen-free linear aromatic polyester the organic monomer residues of which consist of a bisphenol monomer residue and a dicarboxylic acid monomer residue said polyester being uniformly blended with said filled polybutylene terephthalate and having an intrinsic viscosity of no more than about 0.5 dl/g. as determined from a 0.5% by weight solution of the bisphenol polyester in symmetrical tetrachloroethane at 30°, the proportion of the bisphenol polyester being based on the combined weight of the glass fiber-filled polybutylene terephthalate and the bisphenol polyester.

By the description of the present bisphenol polyester as substantially halogen-free is meant that the present bisphenol polyester additive of the invention is free of carbon-halogen bonds and contains less than about 0.1% by weight chemically combined halogen, and preferably no chemically combined halogen.

The presence of substantial amounts of halogen substituents, such as chlorine or bromine, in the present bisphenol polyester is undesirable since the presence of halogen increases the melt viscosity of the blended components thereby impairing the processability of the blend and the ease of blending the components.

By use of the bisphenol polyester additive in accordance with the invention, the warpage on molding of the glass fiber-filled polybutylene terephthalate composition of the invention is diminished by as much as about 80% or more. Especially preferred bisphenol polyester-containing compositions of the invention, as described below, also unexpectedly exhibit an enhanced tensile strength compared to the corresponding glass fiber-filled polybutylene terephthalate devoid of the additive of the invention.

The substantial diminishment of warpage on molding the present glass fiber-filled polybutylene terephthalate compositions as achieved by the invention is not accompanied by any substantial loss in the other beneficial properties of the glass fiber-filled polybutylene terephthalate.

DESCRIPTION OF THE PREFERRED EMBODIMENTS

PREPARATION OF LINEAR AROMATIC POLYESTER

The linear bisphenol-carboxylate aromatic polyester additive of the present invention can be prepared by condensing a diacid halide of a dicarboxylic acid, dissolved in an organic liquid which is a solvent for the polyester to be formed, with a metal phenolate of a bisphenol dissolved in a liquid which is immiscible with the solvent for the diacid halide. This process is more fully described in U.S. Pat. No. 3,216,970, to Conix, the disclosure of which is incorporated herein by reference.

The bisphenols which can be used in this process are known in the art and correspond to the general formula:

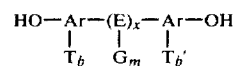

wherein Ar is aromatic, preferably containing 6–18 carbon atoms (including phenyl, biphenyl and naphthyl); G is alkyl, aryl, alkylaryl, arylalkyl, or cycloalkyl; E is a divalent (or di-substituted) alkylene, alkylene, cycloalkylene, or arylene, —O—, —S—, —SO—, —SO$_2$—, —SO$_3$—, —CO—,

or GN<; T and T' are independently selected from the group consisting of G and OG; m is an integer from 0 to the number of replaceable hydrogen atoms on E; b is an integer from 0 to the number of replaceable hydrogen atoms on Ar, and x is 0 or 1. When there is plurality of G substituents in the bisphenols, such substituents may be the same or different. The T and T' substituents may occur in the ortho, meta or para-positions with respect to the hydroxyl radical. The foregoing hydrocarbon radicals preferably have carbon atoms as follows:

alkyl and alkylene of 1 to 14 carbons; aryl and arylene of 6 to 14 carbons; alkylaryl, and arylalkyl of 7 to 14 carbons; and cycloalkyl, and cycloalkylene of 4 to 14 carbons. Additionally, mixtures of the above described bisphenols may be employed to obtain a polymer with especially desired properties. The bisphenols generally contain 12 to about 30 carbon atoms, and preferably 12 to about 25 carbon atoms.

Typical examples of bisphenols having the foregoing formula include bis(4-hydroxyphenyl)methane, bis(2-hydroxyphenyl)methane, (4-hydroxyphenyl-, 2-hydroxyphenyl)-methane, and mixtures thereof; bisphenol-A [bis(4-hydroxyphenyl)-2,2-propane] bis(4-hydroxynaphthyl)-2,2-propane, bis(4-hydroxynaphthyl)-2,2-propane, bis(4-hydroxyphenyl)-phenyl methane, bis(4-hydroxyphenyl) diphenyl methane, bis(4-hydroxyphenyl)-4'-methyl phenyl methane, bis(4-hydroxyphenyl)-1,1-cyclohexane, bis(4-hydroxyphenyl)cyclohexyl methane, 4,4-dihydroxyphenyl, 2,2'-dihydroxydiphenyl, dihydroxynaphthalenes, bis(4-hydroxyphenyl)-2,2-butane, bis(2-methyl-4-hydroxyphenyl)-2,2-propane, bis(3-methyl-4-hydroxyphenyl)-1,1-cyclohexane, bis(2-hydroxy-4methylphenyl)-1, 1-butane, bis(2-hydroxy-4-hydroxy-4-tertiary butylphenyl)-2,2-propane, bis(4-hydroxyphenyl)-1-phenyl-1,1-ethane, 4,4'-dihydroxy-3-methyl diphenyl-2,2-propane, 4,4'-dihydroxy-3-methyl-3'-isopropyl diphenyl-2,2-butane, bis(4-hydroxyphenyl)sulfide, bis(4-hydroxyphenyl)ketone, bis(4-hydroxyphenyl)oxide, bis(4-hydroxyphenyl)sulfone, bis(4-hydroxyphenyl)sulfoxide, bis(4-hydroxyphenyl)sulfonate, bis(4-hydroxyphenyl)amine, and bis(4-hydroxyphenyl)phenyl phosphine oxide. Biphenols can be employed instead of bisphenols. Suitable biphenols are o,o'-biphenol, m,m'-biphenol; p,p'-biphenol; bicresols, such as 4,4'-bi-o-cresol, 6,6'-bi-o-cresol, 4,4'-bi-m-cresol; dibenzyl biphenols such as a,a'-diphenol-4,4'-bi-o-cresol; diethyl biphenols such as 2,2'-diethyl-p,p'-biphenol, and 5,5'-diethyl-o, o'-biphenol; dipropyl biphenols such as 5,5'-dipropyl-o,o'-biphenol and 2,2'-diisopropyl-p,p'-biphenol; and dially biphenols such as 2,2'-diallyl-p,p'-biphenol. Mixtures of isomers of the foregoing bisphenols and biphenols can be used.

The additive of the invention can also conveniently be prepared by the solution preparatory procedures described in E. V. Gouinlock, Jr. et al., U.S. Pat. No. 4,051,106 and J. A. Pawlak et al., U.S. Pat. No. 4,051,107, the subject matter of which patents is incorporated herein by reference.

The dicarboxylic acids which are useful in this process are also well known and are represented by the formula:

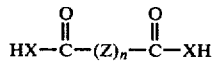

in which X is oxygen or sulfur, Z is alkylene, —Ar— or —Ar—Y—Ar— where Ar has the same definition as given with respect to the bisphenols, Y is an alkylene, of 1 to 10 carbons, —O—, —S—, —SO—, —SO$_2$—, —SO$_3$—, —CO—,

or GN<; and n is 0 or 1.

Suitable dicarboxylic acids include aromatic dicarboxylic acids such as phthalic acid, isophthalic acid, terephthalic acid, bis(4-carboxy)-diphenyl, bis(4-carboxyphenyl)-ether, bis(4-carboxyphenyl)-sulfone, bis(4-carboxyphenyl)-carbonyl, bis(4-carboxyphenyl)-methane, 1,2- and 1, 1-bis(4-carboxyphenyl)-ethane, 1,2- and 2,2-bis(4-carboxyphenyl)-propane, 1,2- and 2,2-bis(3-carboxyphenyl)-propane, 2,2-bis(4-carboxyphenyl)-1, 1-dimethyl propane, 1,1- and 2,2-bis(4-carboxyphenyl)-butane, 1,1- and 2,2-bis(4-carboxyphenyl)-heptane, and aliphatic acids such as oxalic acid, adipic acid, succinic acid, malonic acid, sebacic acid, glutaric acid, azelaic acid, suberic acid and the like. The preferred aromatic polyesters of this invention are prepared from bisphenols and at least one aromatic dicarboxylic acid, most preferably selected from the group consisting of isophthalic acid, terephthalic acid, or mixtures thereof. Isophthalic acid and terephthalic acid are preferred due to their availability and low cost. Most preferably, the dicarboxylic acid component comprises a mixture of about 75 to about 100 mol percent isophthalic acid and about 25 to about 0 mole percent terephthalic acid.

When the dicarboxylic acids used in preparing a polyester of the invention consist of both isophthalic and terephthalic acids in accordance with an especially preferred embodiment of the invention, a weight proportion of isophthalic to terephthalic acid residues in the polyester ranging from about 75:25 to about 90:10 provides an especially satisfactory result.

The polyester components of the invention are preferably prepared by a process, described as melt polymerization, involving an ester interchange, i.e. transesterification reaction, between a diphenolic reactant and a diaryl ester of a dicarboxylic acid carried out in the melt (i.e. without use of a reaction solvent or diluent). Such a process is described in British Pat. No. 924,607, to Imperial Chemical Industries Limited, the disclosure of which is incorporated herein by reference.

To obtain, according to the invention, a uniformly blended composition having satisfactory molding characteristics, the intrinsic viscosity of the bisphenol polyester additive should be no greater than about 0.5 dl/g. and will generally be at least about 0.2 dl/g. (as determined from a 0.5% by weight solution of the additive in symmetrical tetrachloroethane at 30° C.).

As is known from the discussion of intrinsic viscosity of polymers in F. W. Billmeyer, Jr., "Textbook of Polymer Sciences", Wiley Interscience, Second Edition, 1971, pages 84–90 (the disclosure of which is incorporated herein by reference) the intrinsic viscosity of a linear polymer such as the bisphenol polymeric additive of the invention is a measure of the size or molecular weight of the polymer with high intrinsic viscosity indicating high molecular weight and low intrinsic voscosity indicating low molecular weight. Accordingly, the intrinsic viscosities of the present additive indicate a relatively low molecular weight for the additive.

PREPARATION OF THE COMPOSITIONS OF THE INVENTION

The proportion of bisphenol polyester employed in the compositions of the invention to achieve diminished warpage on molding without substantial loss of beneficial properties of the glass fiber-filled polybutylene terephthalate component is a minor proportion (about 1% to less than 50%) and preferably is about 1 to less than 30% based on the combined weight of the glass fiber-filled polybutylene terephthalate component and the bisphenol polyester additive. Preferably the proportion of the bisphenol polyester is about 5 to about 20% based on the combined weight of the glass fiber-filled polybutylene terephthalate and the bisphenol polyester. Compositions of the invention which contain about 5 to about 10% by weight of the bisphenol polyester based on the combined weight of the glass fiber-filled polybutylene terephthalate and the bisphenol polyester are especially preferred since such compositions exhibit, in addition to diminished warpage on molding, a substantial enhancement in tensile strength compared to a comparable glass fiber-filled polybutylene terephthalate devoid of the bisphenol polyester additive of the invention (as is illustrated by the data presented in Table II below).

The amount of glass fiber employed as a reinforcing filler in the composition of the invention generally corresponds to the amount of glass fiber-filler employed in glass fiber-filled polybutylene terephthalate of the prior art and is conveniently about 1 to about 50 weight percent, preferably about 10 to about 30 weight percent, based on the combined weight of the glass fiber-filled polybutylene terephthalate and the bisphenol polyester.

The compositions of the invention are uniform or homogeneous blends of the glass fiber filler, the polybutylene terephthalate, and can be prepared by blending the bisphenol polyester with the glass fiber filler and the polybutylene terephthalate prior to or during processing while the polybutylene terephthalate and the bisphenol polyester additive are in molten condition. Typically glass fiber filler, polybutylene therephthalate and the bisphenol polyester additive of the invention are dried and agitated in a mixing vessel to obtain a homogeneous physical mixture of the components. The resultant mixture is then subjected to processing in a conventional extrusion or injection molding apparatus to melt and blend the polymer components of the present composition and at the same time to effect substantially homogeneous dispersion of the glass fiber filler throughout the blend of the polybutylene terephthalate and the bisphenol polyester. The solidified molded product thus obtained may be ground and again subjected to the foregoing melt processing operation to insure that a substantially homogeneous dispersion of the glass fiber filler in the composition is obtained.

Alternative to charging glass fiber and the bisphenol polyester separately to the aforementioned mixing step of the above-discussed preparatory procedure, the glass fiber and the bisphenol polyester may be added as glass fiber-filled bisphenol polyester, i.e. as the composition described by T. Okamoto, Japanese Patent Publication No. Sho-49-34945, published Mar. 30, 1974, the subject matter of which is incorporated herein by reference. Alternatively, the glass fiber-filler and polybutylene terephthalate components of the present composition may be charged as commercially available flass fiber-filled polybutylene terephthalate.

OPTIONAL ADDITIVES

The glass fiber filler which is employed as a reinforcement filler in the present compositions may advantageously contain an organic coupling agent which is normally applied as a thin surface coating on the glas fibers. Many available proprietary glass fiber materials contain such a coupling agent coating. The coupling agent forms an adhesive bridge between the surface of the glass fiber and the polymer substrate to which the glass fiber is charged thereby enhancing the strenght properties of the filled polymer blend. Typically, organic coupling agents employed in the art include transition metal complexes of unsaturated aliphatic acids such as methacrylate chromic complex as well as organic silane compounds such as vinyl trichlorosilane, vinyl triethoxysilane, allyl trichlorosilane resorcinol and the like. Organic coupling agents useful with glass fiber filler in glass fiber-filled polyester compositions are more particularly discussed and illustrated in copending U.S. application Ser. No. 905,623, filed May 12, 1978, the subject matter of which is incorporated herein by reference.

Optionally also the compositions of the invention can also include one or more of the following classes of conventional functional additives for glass fiber-filled polybutylene terephthalate each of which is typically employed in proportion of about 0.01 to about 5 percent by weight of the present composition: wheatherability stabilizers, lubricants, antistatic agents, coloring agents, nucleating agents, fire retardants, and antioxidants. The illustration and use of these conventional functional additives for glass fiber-filled polybutylene terephthalate is more particularly set forth in S. Saitoh et al., U.S. Pat. No. 4,064,098, issued Dec. 20, 1977, the disclosure of which is incorporated herein by reference.

In addition to the glass fiber reinforcement filler employed in the compositions of the invention the compositions of the invention may optionally contain additional fillers as diluents and/or reinforcement agents for example asbestos, glass powder, glass beads, clay, mica, diatomaceous earth, silica, calcium carbonate and the like. The proportion of these additional optional fillers when used is about 1 to 50 weight percent of the weight total composition including the glass fiber-filled polybutylene terephthalate, the bisphenol polyester additive and the aforementioned optional filler.

Since the glass fiber-reinforced polyester resin composition of this invention has reduced warping in molded articles without impairing its desirable properties such as excellent tensile strength, high heat distortion temperature and chemical resistance, its utility as an engineering plastic can be broadened. For example, the composition in accordance with this invention can replace metallic material in the fields of component parts of precision machines, and inner and outer decorative parts of automobiles.

The following examples further illustrate the various aspects of the invention but are not intended to limit it. Various modifications can be made in the invention without departing from the spirit and scope thereof. Where not otherwise specified in this specification and claims, temperatures are given in degrees centigrade, and all parts, proportions and percentages are by weight.

EXAMPLE 1

PREPARATION OF LINEAR AROMATIC POLYESTER (A) By Melt (transesterification) Polymerization Diphenyl isophthalate (1623.5 g., 5.10 moles), diphenyl terephthalate (286.5 g., 0.90 moles), bisphenol A (1369,8 g., 6.0 moles) which had been previously dried and lithium hydroxide transesterification catalyst (0.072 g., 0.003 mole) are changed to a 5-liter resin kettle. The kettle is equipped with a thermometer, a nitrogen inlet on a Y-tube, a mechanical stirrer, a short Vigreaux column, a distillation head and 3 necked flask receiver. Under an atmosphere of dry nitrogen the reaction mixture is heated to 180° with agitation. Vacuum is applied to the reaction mixture gradually and the reaction mass temperature is increased gradually as phenol is removed overhead. After 50 minutes little phenol is being removed overhead and the pressure over the reaction mixture is 0.1 mm. Hg with the reaction mixture temperature being about 217°. The viscous liquid reaction mass is discharged into trays and allowed to cool to ambient temperature. During the reaction 86.8% of the theoretical amount of phenol is recovered. The thus obtained ester prepolymer which is a brittle solid having an intrinsic viscosity of 0.13 dl./g. (determined from a 5% by weight solution of the ester prepolymer in symmetrical tetrachloroethane at 30°) is crushed into particles.

About 1100 g. of the aforementioned particulate prepolymer is dried for about 16 hours in a vacuum oven at 70° and charged to a 2-gallon stainless steel reactor equipped with agitation means under an atmosphere or dry nitrogen. Over a period of 1 hour and 35 minutes the agitated reaction mass is heated to a temperature of about 212° C. A vacuum of 1 mm. Hg is then applied to the molten mass, and the reaction mass temperature is raised to 289° over a period of two hours. The polymer product is then discharged from the reactor. About 681 g. of product is recovered from he reaction vessel and about 285 g. of product is recovered from the reaction vessel agitator. The recovered bisphenol A-isophthalate-terephthalate polyester is clear and light yellow in color and has an intrinsic viscosity of 0.43 dl./g. (determined from a 0.5% by weight solution of the polyester in symmetrical tetrachloroethane at 30°).

(B) By Solution Polymerization

A 100 gallon reaction vessel equipped with agitation means is purged of air by passage or dry nitrogen gas. To this reactor is charged isophthaloyl chloride (16566 g., 81.6 moles), terephthaloyl chloride (2924 g., 14.4 moles), bisphenol A, which had been dried in vacuo at 100° for 4 hours (21693 g., 95.0 moles) and p-tertiary butyl phenol, a reaction mixture viscosity control agent (300 g., 2.0 moles) which are dissolved in 226 kg. of methylene chloride solvent. The mixture is agitated for 15 minutes under an atmosphere of dry nitrogen and then triethylamine esterification catalyst (20,049 g., 198 moles) is gradually added to the reaction mixture over about 5 hours from a 50 gallon tank while the reaction mixture is maintained at a temperature of 24°–25°. After the catalyst addition has been completed, the 50 gallon tank is rinsed with additional methylene chloride (40.82 kg) and the methylene chloride rinse is added to the reaction mixture. The reaction mixture is agitated at 25° for three hours and then 650 cc of concentrated aqueous hydrochloric acid with about 56.6 liters of deionized water are added to the reaction mixture which is allowed to separate into an organic layer and an aqueous layer. The aqueous layer is discarded and the organic layer is washed free of chloride ion by repeated washings with deionized water. The polyester product is precipitated from the washed organic layer by gradual addition of isopropyl alcohol with simultaneous removal overhead of most of the methylene chloride. The recovered product is further dried to obtain a bisphenol A-isophthalate-terephthalate polyester which has an intrinsic viscosity of 0.46 dl./g, as determined from a 0.5% by weight solution of the polyester in symmetrical tetrachloroethane at 30°.

EXAMPLE 2

Polybutylene terephthalate (650 g. manufactured by Goodyear Tire and Rubber Co. under the designation 5716A), 50 g. of the melt polymerization prepared bisphenol A-isophthalate-terephthalate polyester of Example 1A and 300 g. of chopped glass fiber (3/16 inch length, manufactured by Owens Corning Fiberglass Corp. under the designation 419AA, which contains a proprietary silane coupling agent) are dried for 3 hours at 120°. The dried materials are sealed in a glass jar and agitated by tumbling for about 20 minutes to obtain a homogeneous mixture.

The resultant mixture is fed into a 70 ton New Britain injection molding machine equipped with a hopper drier. Molded bars are prapared by injection molding in the aforementioned apparatus which operates at the following conditions:

Barrel Temperature: 480° F.
Mold Temperature: 158° F.
Injection Pressure: 10,000 to 11,000 psi The bars obtained by injection molding are granulated to an average particle diameter of about 3 mm. and dried for 3 hours. The dried particulate mixture is again fed to the aforementioned New Britain molding machine and injected molded into stepped injection specimens (described below) which are suitable for testing for warpage. The injection molding apparatus is, in this instance, operated under the following conditions:

Barrel Temperature: 500° F.
Mold Temperature: 158° F.
Injection Pressure: 10,000 psi The resultant specimens which contain about 65% by weight of polybutylene terephthalate, about 5.0% by weight of bisphenol A-isophthalate-terephthalate polyester and 30.0% of glass fiber (said percentages based on the weight of the composition), are tested for warpage in accordance with the Warpage Testing Procedure described below and the results of the warpage test are set forth in Table I below.

EXAMPLE 3

The procedure of Example 2 is repeated substantially as described except that 600 g. of the polybutylene terephthalate, 100 g. of the bisphenol A polyester additive and 300 g. of the glass fiber are employed. The product which contains about 60% of the polybutylene terephthalate, about 10.0% of the bisphenol A polyester and about 30.0% of the glass fibers is tested for warpage as in Example 2. The warpage results of this test are reported in Table I below.

EXAMPLE 4

The procedure of Example 2 is repeated substantially as described except that 550 g. of the polybutylene terephthalate, 150 g. of the bisphenol A polyester and 300 g. of the glass fibers are employed. The product which contains about 55% of the polybutylene terephthalate, about 15.0% of the bisphenol A polyester and 30.0% of the glass fibers is tested for warpage as in Example 2. The warpage results of this test are also reported in Table I below.

EXAMPLE 5 (Control)

The procedure of Example 2 is repeated substantially as described in preparing a glass fiber filled polybutylene terephthalate omitting bisphenol A-isophthalate-terephthalate polyester additive of the invention. In this Control Example, 700 g. of the polybutylene terephthalate and 300 g. of the glass fibers are employed to prepare a product which contains 70% polybutylene terephthalate and 30% glass fibers. The product is tested for warpage as in Example 2 and the results of this test are compared in Table I below to the warpage test results for the products of Examples 2–4.

WARPAGE TESTING PROCEDURE

The products of the invention as prepared according to Examples 2, 3 and 4 and a comparable control of pure glass fiber-filled polybutylene terephthalate as described in Example 5 are each tested for warpage according to the following procedure.

In each determination of warpage two equivalent injection molded specimens of the resin to be tested, 7.5 mm. in width and 10.2 mm. in length are employed. One surface of each molded specimen is essentially planar (except for any departure from planarity due to warpage as described below) while the other surface is stepped so that each specimen contains 3 approximately equal segments of different thickness, the thickest section being ⅛ inch in thickness, the middle section being 1/16 inch in thickness and the thinnest section being 1/32 inch in thickness. The two specimens are clamped back to back along their essentially planar surfaces so that the thickest section of one specimen is congruently back to back with the thickest section of the other specimen and likewise the thinnest section of one specimen is congruently back to back with the thinnest section of the other specimen. Since warpage in a glass-fiber filled polybutylene terephthalate manifests itself as a domed or convex curvature distortion away from the aforementioned planar surface, the maximum distance of separation, designated by the symbol, $\Delta$, between the thinnest specimen sections (along the edge of the clamped-together specimens which measures 7.5 mm.) is determined as a measure of warpage in the material being tested. The use of specimens having sections of different thickness is desirable in the aforementioned warpage test since a maximum of warpage in an injected molded resin specimen is known to be manifested when the molded specimen has several different thicknesses (as indicated by I. I. Rubin "Injection Molding", Wiley-Interscience, 1972, pgs. 268–269, the subject matter of which is incorporated herein by reference).

In the following Table I wherein the warpage test results are compared the ratio of $\Delta$ of product to $\Delta$ of the control (wherein the control is pure glass fiber-filled polybutylene terephthalate) multiplied by 100 is designated Index of Warpage and indicates the percentage of warpage of the product of the invention compared to warpage in the pure glass fiber-filled polybutylene terephthalate control.

TABLE I

| EXAMPLE: | 2 | 3 | 4 | 5 (Control) |
|---|---|---|---|---|
| Components: | | | | |
| Polybutylene Terephthalate | 650(65.0%) | 600(60.0%) | 550(55.0%) | 700(70%) |
| Bisphenol A-isophthalate-terephthalate polyester | 50(5.0%) | 100(10.0%) | 150(15.0%) | none |
| Glass Fiber (containing surface coating of proprietary silane coupling agent) | 300(30.0%) | 300(30.0%) | 300(30.0%) | 300(30.0%) |
| $\Delta$ in inches | 0.172* | 0.107** | 0.043* | 0.215* |
| Index of Warpage = $\dfrac{\Delta \text{ product}}{\Delta \text{ control}}(100)$ | 79.5 | 49.7 | 20.0 | 100 |

*Average of six separate determinations of $\Delta$ from six equivalent products
**Average of four separate determinations of $\Delta$ from four equivalent products From the Index of Warpage results in the above Table it is apparent that the compositions of the invention prepared in accordance with Examples 2, 3 and 4 have only about 79.5, 49.7 and 20.0 percent, respectively, of the warpage on molding encountered in a comparable control glass fiber-filled polybutylene terephthalate, i.e. the control product of Example 5 which does not contain the bisphenol A polyester additive of the invention. Accordingly, the data of the Table indicates that, in accordance with the invention, the bisphenol A polyester additive is an effective warpage control agent for glass fiber-filled polybutylene terephthalate.

EXAMPLE 6

An injected molded blends of polybutylene terephthalate, a bisphenol A-isophthalate-terephthalate polyester and glass fibers is prepared substantially in accordance with procedure of the foregoing illustrative Example 2 except that there are employed as starting materials 1500 g. of a proprietary glass fiber reinforced polybutylene terephthalate (which contains about 30% by weight glass fibers) and 150 g. of a bisphenol A-isophthalate-terephthalate polyester prepared by solution polymerization as described in Example 1(B) above.

The molded product (substantially similar in its excellent properties to the products of the aforementioned illustrative Examples of the invention) contains about 63.6% polybutylene terephthalate, about 9.1% of the bisphenol A polyester additive and 27.3% of glass fibers (said percentages being based on the weight of the product composition). This product is compared in warpage to a comparable control prepared by injection molding of the aforementioned proprietary glass-fiber filled polybutylene terephthalate composition employing the above described testing procedure for warpage except that the $\Delta$ of product and the $\Delta$ of the control are qualitatively compared. Since the $\Delta$ of the product containing the bisphenol A polyester additive of the invention is observed to be substantially smaller than the $\Delta$ of the comparable control specimen, the results of this example also indicate that the bisphenol A polyester is an effective warpage control agent for glass fiber filled polybutylene terephthalate.

EXAMPLE 7

The compositions described in Examples 2, 3 and 4 and the Control composition of Example 5 are injection molded substantially in accordance with the procedure of Example 2 to provide specimen bars suitable for use in measuring the tensile properties (i.e. tensile strength, tensile modulus and percent elongation) of the compositions. The tensile properties of the compositions are measured and reported in Table II below.

TABLE II

| COMPOSITION OF EXAMPLE: | 2 | 3 | 4 | 5 (Control) |
|---|---|---|---|---|
| Components: | | | | |
| Polybutylene Terephthalate | 650(65.0%) | 600(60.0%) | 550(55.0%) | 700(70%) |
| Bisphenol A-isophthalate-terephthalate polyester | 50(5.0%) | 100(10.0%) | 150(15.0%) | none |
| Glass Fiber (containing surface coating of proprietary silane coupling agent) | 300(30.0%) | 300(30.0%) | 300(30.0%) | 300(30.0%) |
| Tensile Strength (psi) | 17,400 | 17,600 | 16,800 | 16,900 |
| Tensile Modulus (psi × 10$^6$) | 1.47 | 1.51 | 1.41 | 1.50 |
| % Elongation | 2.48 | 2.53 | 2.56 | 2.60 |

Comparison of the tensile strength data of Table II indicates that especially preferred compositions of the invention, i.e. those containing about 5 to about 10 weight percent of the bisphenol A polyester additive of the invention (as illustrated by the compositions of Examples 2 and 3) have enhanced tensile strength compared to a comparable control composition of pure glass fiber-filled polybutylene terephthalate (the composition of Control Example 5).

The invention has been described in the above specification and illustrated by reference to specific embodiments in the illustrative examples. However, it is to be understood that these embodiments are not intended to limit the invention since changes and modifications in the specific details disclosed hereinabove can be made without departing from the scope or spirit of the invention.

What is claimed is:

1. In a thermoplastic polymeric composition comprising a glass fiber-filled polybutylene terephthalate, the improvement wherein the composition contains in admixture as the sole organic polymeric additive a minor proportion of an organic polymeric additive consisting of a substantially halogen-free linear aromatic polyester, the organic monomer residues of which consist of a bisphenol monomer residue and a dicarboxylic acid monomer residue, said polyester having an intrinsic viscosity of no more than about 0.5 dl./g., as determined from a 0.5% weight solution of the bisphenol polyester in symmetrical tetrachloroethane at 30° C., the weight proportion of the bisphenol polyester being less than 30% based on the combined weight of the glass fiber-filled polybutylene terephthalate and the bisphenol polyester.

2. The composition of claim 1 wherein the proportion of the bisphenol-derived linear polyester is about 1 weight percent to less than 30 weight percent and the proportion of glass fiber-filler is about 1 weight percent to about 50 weight percent said proportions being based on combined weight of the glass fiber-filled polybutylene terephthalate and the bisphenol polyester.

3. The composition of claim 2 wherein said dicarboxylic acid has the formula:

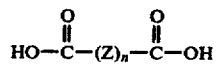

wherein Z is alkylene, —Ar— or —Ar—Y—Ar— where Ar is aromatic, Y is alkylene, —O—, —S—, —SO$_2$—, —SO$_3$—, —CO—,

or GN<; wherein G is alkyl, aryl, alkylaryl, arylalkyl, or cycloalkyl; and n is 0 or 1.

4. The composition of claim 3 wherein said dicarboxylic acid is an aromatic dicarboxylic acid.

5. The composition of claim 4 wherein said aromatic dicarboxylic acid is selected from the group consisting of isophthalic acid, terephthalic acid, and mixtures thereof.

6. The composition of claim 1 wherein said bisphenol has the formula:

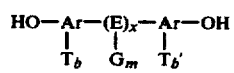

wherein Ar is aromatic, G is alkyl, aryl, alkylaryl, arylalkyl, or cycloalkyl; E is divalent alkylene, cycloalkylene, or arylene, —O—, —S—, —SO—, —SO$_2$—, —SO$_3$—, —CO—,

or GN<; T and T' are independently selected from the group consisting of G and OG; m is an integer from 0 to the number of replaceable hydrogen atoms on E; b is an integer from 0 to the number of replaceable hydrogen atoms on Ar, and x is 0 or 1.

7. The composition of claim 6 wherein the bisphenol is bisphenol-A.

8. The composition of claim 1 wherein the bisphenol polyester is prepared by a melt polymerization process.

9. The composition of claim 2 wherein the proportion of glass fiber filler is about 10 to about 30 weight percent based on the combined weight of the glass fiber-filled polybutylene terephthalate and the bisphenol polyester.

10. The composition of claim 2 wherein the proportion of the bisphenol-derived linear polyester is about 5% to about 20% based on the combined weight of the glass fiber-filled polybutylene terephthalate and the bisphenol polyester.

11. The composition of claim 10 wherein the proportion of the bisphenol-derived linear aromatic polyester is about 5% to about 10% based on the combined weight of the glass fiber-filled polybutylene terephthalate and the bisphenol polyester.

12. The composition of claim 1 wherein the glass fiber filler is surface coated with an organic coupling agent.

13. A thermoplastic resin glass fiber filled polybutylene terephthalate composition inhibited against warpage which consists essentially of about 1 to less than 30% by weight of a linear aromatic polyester consisting of bisphenol A, isophthalic acid and terephthalic acid monomer residues, said linear aromatic polyester being uniformly blended with said filled polybutylene terephthalate and having an intrinsic viscosity of about 0.2 to no more than about 0.5 dl/g. as determined from a 0.5% by weight solution of the bisphenol polyester in symmetrical tetrachloroethane at 30° and about 1% to about 30% by weight glass fibers with the balance of the composition being polybutylene terephthalate, said proportions of the components being based on the combined weight of the glass fiber, the polybutylene terephthalate and the bisphenol A polyester.

14. A molded article formed from the composition of claim 1.

15. A molded article formed from the composition of claim 11.

16. A molded article formed from the composition of claim 13.

* * * * *